A. A. DURAND.
Mechanical Cow-Milker.
No. 216,838. Patented June 24, 1879.
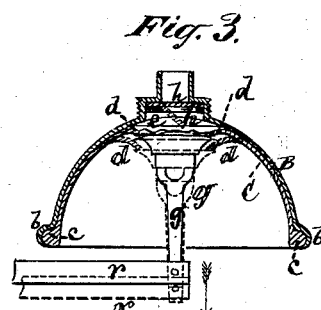
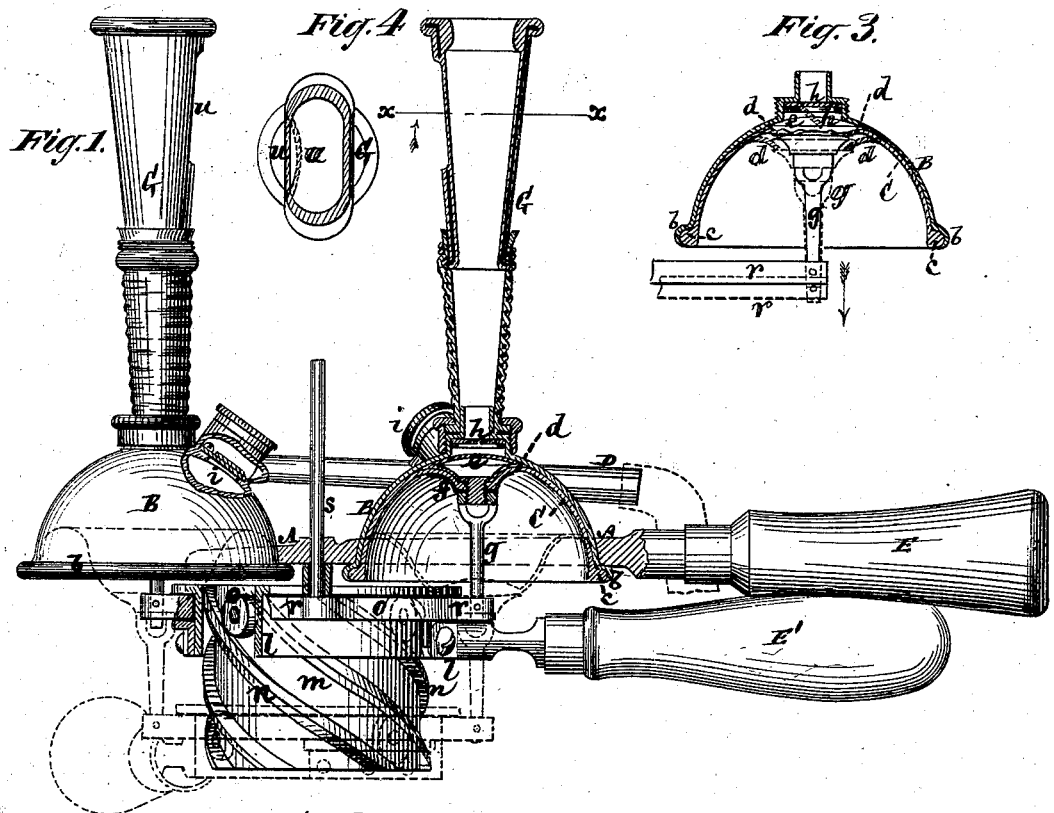
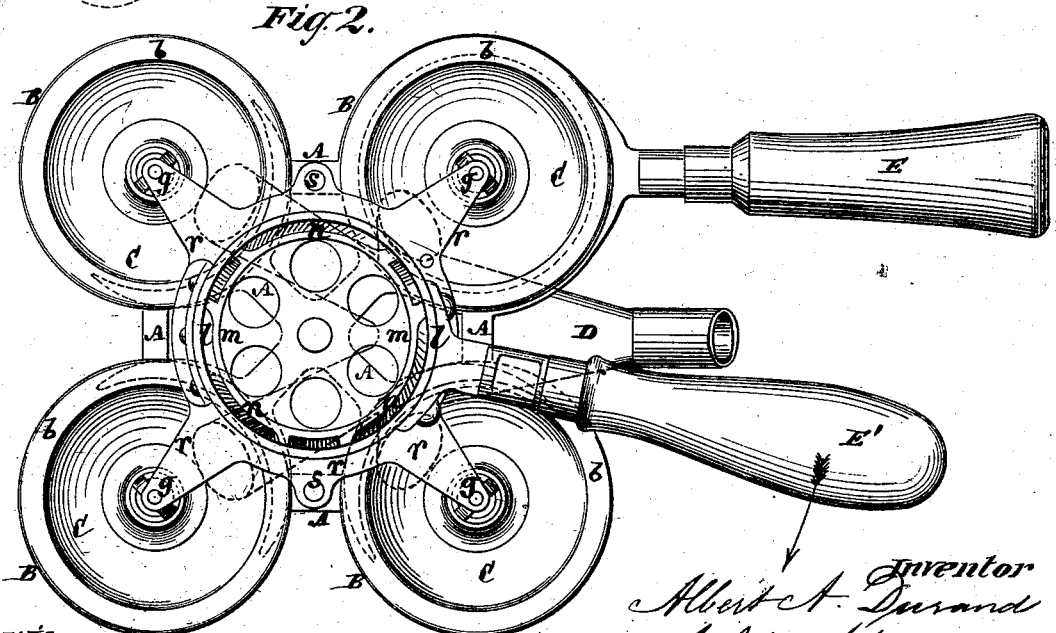
Witnesses
John Becker
Fred. Haynes
Inventor
Albert A. Durand
by his Attorneys
Brown & Brown

UNITED STATES PATENT OFFICE

ALBERT A. DURAND, OF NEW YORK, N. Y.

IMPROVEMENT IN MECHANICAL COW-MILKERS.

Specification forming part of Letters Patent No. 216,838, dated June 24, 1879; application filed November 1, 1878.

*To all whom it may concern:*

Be it known that I, ALBERT A. DURAND, of the city, county, and State of New York, have invented certain new and useful Improvements in Mechanical Cow-Milkers, of which the following is a description, reference being had to the accompanying drawings, forming part of this specification.

This invention more particularly relates to hand apparatus or machines for milking cows, designed to be separately applied to each animal, and in which a series of pumps, one for each teat of the cow, are arranged for simultaneous operation by a single lever or handle having a shears-like action relatively to a fixed lever or handle attached to the frame which carries the pumps, as in L. O. Colvin's patent of March 28, 1865, and in which, as in L. O. Colvin's patent of May 22, 1860, the teat-sockets are of irregular flexibility in different portions of their length, for the purpose of producing a lateral pressure on the teats during the exhausting action of the pumps.

The invention consists in certain novel combinations of devices for operating the pumps with the frame carrying the latter, and with the flexible diaphragms and other details of the pumps, whereby an easy and straight pull or thrust on said diaphragms, and a very efficient action generally, are obtained for the pumps.

The invention also consists in a flexible teat-socket of reduced thickness or greater flexibility at one or more portions of its sides than the intermediate portions in the same transverse plane or planes, whereby an isolated pulse-like action on the side of the teat, as distinguished from a lateral pressure all around it, and in closer imitation of the natural action of the tongue and mouth of a sucking calf on the teat is produced.

In the accompanying drawings, Figure 1 represents a partly-sectional elevation of a cow-milker, constructed in accordance with the invention. Fig. 2 is an inverted plan of the same; Fig. 3, a sectional elevation of one of the pump chambers or cups, with the working diaphragm thereof in different positions; and Fig. 4, a horizontal section through one of the teat-sockets on the line $x\ x$ in Fig. 1.

A A represent the frame of the apparatus, of a suitable construction to carry the pumps and other working parts. These pumps, of which there is one for each teat, are formed in part each of an inverted cup, B, preferably of a dome shape, having a hollow bead, $b$, around its lower edge, which receives and holds within it a lower rounded rib or flange, $c$, of a flexible rubber or other suitable cup-shaped diaphragm, C, that when at rest and occupying a raised position within the cup conforms, or nearly so, to the interior configuration of the cup. Said diaphragm is of a spherical or spheroidal shape, dipping inward at its upper or central portion, $d$, and forming a gentle or easy curve at the junction of said central portion with the sides of the diaphragm, and is or may be held in such shape by a suitably-formed upper clamping plate or cap, $e$, under clamping plate or washer, $f$, and a working rod-connection, $g$, arranged to screw onto a screw-shank of the upper clamping-plate beneath the washer $f$. This construction of the rubber or flexible diaphragm at its central portion does away with or reduces the liability of the diaphragm to break at said part as it is flexed or turned inside out in working the pump to produce the necessary suction and delivery action. This is clearly illustrated in Fig. 3, which indicates by full lines the position of the diaphragm when raised, and by dotted lines its position after starting to produce the suction.

Each pump is furnished above its flexible diaphragm C with an inlet-valve, $h$, and a delivery-valve, $i$, the latter opening into branches or passages which connect with a general delivery spout or duct, D, that conveys the milk by the several pumps to any suitable receptacle.

Fixedly attached to the pump or main frame A A is a handle, E, and movably connected with the central portion of said frame is a working-handle, E', having a shears-like motion horizontally, or thereabout, toward and from the handle E.

The diaphragms C of the several pumps are worked downward or outward to produce the necessary suction against the pressure of the atmosphere on their exterior or under surfaces by mechanical means connected with the working lever or handle E', and which cause the several pumps to act synchronously. These means consist of a ring or nut, *l*, attached to the inner end of the lever-handle E′; a fixed center-piece, *m*, having one or more right or left handed screw-threads, *n*, on it, and around which it is free to turn as said handle is worked with a shears-like motion toward and from the handle E; studs or rollers *o o* carried by said ring and arranged to gear with the spirally-threaded, or it might be spirally-grooved, center-piece *m*, which is carried by the pump-frame; and a follower, *r*, guided in a straight up-and-down course by rods *s*, passing through the main frame A A, and which follower is connected with the ring or nut *l*, so as to rise and fall with it as the latter is moved to and fro on the spiral center-piece *m*, and is furthermore connected with the working-rods *g* of the pump-diaphragms. In this way or by these means the movement of the working-handle E′ in one direction acts upon the diaphragms of the several pumps with an easy and straight pulling action to produce the necessary suction; and the return motion of said handle, aided by atmospheric pressure on the exterior of the diaphragms, exerts a like easy and straight thrust on the latter to discharge the milk from the pumps.

G G are the teat-sockets, which are attached to the inverted cups or chambers B B of the pumps. The upper portion of each of these sockets, which receives the teat within it and is adjusted up against the udder, is generally or mainly of sufficient stiffness to retain its normal shape and to keep pressure off the teats, but has one or more parts, *u*, of its side or sides of reduced thickness or greater flexibility than the intermediate portions in the same transverse plane or planes, and the teat-socket preferably made of an oblong form in its transverse section at such reduced portion or portions, as shown in Fig. 4.

By thus constructing the teat-socket with one or more portions of it of greater flexibility than the intermediate portions thereof in the same transverse plane or planes, said socket is prevented from throttling or improperly pressing all around on the teat at such reduced or laterally-pressing portion when the pump makes its exhausting-stroke, and an isolated pulse-like action of the reduced portion *u* on the side of the teat is obtained, thereby causing the teat-socket to more closely imitate than has heretofore been done the natural action of the tongue and mouth of a sucking calf on the teat.

I claim—

1. The combination, with the frame which carries the pumps, and with a working-handle for operating the latter, of a stationary spirally threaded or grooved center-piece, with which said handle engages and about which it is free to turn, and a rising and falling follower attached to said handle and connected with the diaphragms of the pumps, essentially as described.

2. The combination of the frame A, having an attached handle, E, the inverted cups B, the flexible diaphragms C, the inlet-valves *h*, the delivery-valves *i*, the working-handle E′, the ring or nut *l*, provided with studs or rollers *o o*, the spirally grooved or threaded center piece *m*, the follower *r*, and the connections or rods *g* between said follower and the flexible diaphragms of the pumps, substantially as specified.

3. In a teat-socket of irregular flexibility for the purpose of producing a lateral pressure on the teat during the exhausting action of the pump, the construction of said socket at one or more portions, *u*, of its sides of a reduced thickness and greater flexibility than the intermediate portions in the same transverse plane or planes, essentially as and for the purpose herein set forth.

ALBERT A. DURAND.

Witnesses:
T. J. KEANE,
FRED. HAYNES.